US011256721B2

(12) United States Patent
Belyaev

(10) Patent No.: US 11,256,721 B2
(45) Date of Patent: Feb. 22, 2022

(54) SYSTEM AND METHOD FOR SANDBOXING SUPPORT IN A MULTIDIMENSIONAL DATABASE ENVIRONMENT

(71) Applicant: ORACLE INTERNATIONAL CORPORATION, Redwood Shores, CA (US)

(72) Inventor: Victor Belyaev, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 837 days.

(21) Appl. No.: 15/332,776

(22) Filed: Oct. 24, 2016

(65) Prior Publication Data
US 2017/0116411 A1    Apr. 27, 2017

Related U.S. Application Data

(60) Provisional application No. 62/245,889, filed on Oct. 23, 2015.

(51) Int. Cl.
*G06F 16/00* (2019.01)
*G06F 16/28* (2019.01)
*G06F 16/2458* (2019.01)

(52) U.S. Cl.
CPC ........ *G06F 16/283* (2019.01); *G06F 16/2468* (2019.01)

(58) Field of Classification Search
CPC ..... G06F 16/2468; G06F 16/283; G06F 21/53
(Continued)

(56) References Cited

U.S. PATENT DOCUMENTS 6,766,325 B1   7/2004  Pasumansky
8,751,466 B1 *  6/2014  Tsay .................... G06F 16/951
                                                    707/700
(Continued)

FOREIGN PATENT DOCUMENTS

CN         1354860       6/2002
CN       101556602      10/2009
(Continued)

OTHER PUBLICATIONS

Oracle®, Oracle® Essbase Release 11.1.1, Database Administrator's Guide, Oracle® Enterprise Performance Management System, Copyright © 1996, 2008, 1182 pages.
(Continued)

*Primary Examiner* — Michelle N Owyang
(74) *Attorney, Agent, or Firm* — Tucker Ellis LLP

(57) ABSTRACT

In accordance with an embodiment, described herein is a system and method for providing sandboxing support in a multidimensional database environment. A plurality of sandboxes and a baseline data can be provided in a multidimensional database server, with each sandbox created for a particular "what-if" analysis, and configured to store one or more changes to the baseline data. When a request is received for a report on a particular "what-if" analysis from a client/user, the multidimensional database server can split the request into a first query and the second query, with the first query directed to a sandbox associated with the client/user, and the second query directed to the baseline data. The multidimensional database server can merge results from the first query and the second query, and perform aggregations and calculations on the merged data, before sending the merged data to a client.

20 Claims, 6 Drawing Sheets

(58) Field of Classification Search
USPC .................................................. 707/705–780
See application file for complete search history.

(56) References Cited

U.S. PATENT DOCUMENTS

| | | | |
|---|---|---|---|
| 9,003,231 B1* | 4/2015 | Graves ................. | G06F 11/1417 714/27 |
| 9,665,621 B1* | 5/2017 | Reiner ............... | G06F 16/24544 |
| 10,055,470 B1* | 8/2018 | Manzo .............. | G06F 16/24542 |
| 10,133,797 B1* | 11/2018 | Mishra ................. | G06F 16/254 |
| 2005/0138013 A1 | 6/2005 | Walker | |
| 2005/0262108 A1 | 11/2005 | Gupta | |
| 2008/0046369 A1* | 2/2008 | Wood ..................... | G06F 21/31 705/50 |
| 2010/0241646 A1* | 9/2010 | Friedman .......... | G06F 16/24532 707/764 |
| 2011/0082830 A1* | 4/2011 | Ramaiyer ........... | G06F 16/2329 707/602 |
| 2011/0313999 A1* | 12/2011 | Bruno .............. | G06F 16/24537 707/718 |
| 2013/0318095 A1* | 11/2013 | Harold .................. | G06F 16/316 707/741 |
| 2014/0379695 A1* | 12/2014 | Waters .................... | G06F 21/53 707/722 |
| 2015/0095841 A1* | 4/2015 | Fiedler ............... | G06F 16/2423 715/781 |
| 2016/0110541 A1* | 4/2016 | Kulkarni ................. | G06F 21/53 726/22 |
| 2016/0379125 A1* | 12/2016 | Bordawekar .......... | G06N 7/005 706/12 |

FOREIGN PATENT DOCUMENTS

| | | |
|---|---|---|
| CN | 103136350 | 6/2013 |
| JP | 2008547086 | 12/2008 |
| JP | 2009512909 | 3/2009 |
| JP | 2015045996 | 3/2015 |
| WO | 2006138044 A2 | 12/2006 |

OTHER PUBLICATIONS

Oracle®, Oracle Business Intelligence Foundation Suite, Technical Overview, Jan. 2011, © Oracle 2011, 56 pages.
European Patent Office, International Searching Authority, International Search Report and Written Opinion dated Jan. 30, 2017 For International Application No. PCT/US2016/057968, 13 Pages.
Guoliang Zhou et al., "What-If Analysis in Molap Environments", 2009 Sixth International Conference on Fuzzy Systems and Knowledge Discovery, © 2009 IEEE, 5 Pages.
Bartosz Bebel et al., "Creation and Management of Versions in Multiversion Data Warehouse", 2004 ACM Symposium on Applied Computing, SAC'04, Mar. 14-17, 2004, Nicosia, Cyprus, Copyright 2004 ACM, 7 Pages.
Chinese Patent Office, Office Action dated May 7, 2020 for Chinese Patent Application No. 201680025680.X, 9 pages.
Indian Patent Office, First Examination Report dated Jun. 30, 2020 for Indian Patent Application No. 201747033336, 7 pages.
Japanese Patent Office, Office Action dated Oct. 6, 2020 for Japanese Patent Application No. 2017-558691, 3 pages.
China National Intellectual Property Administration, The Second Office Action dated Apr. 28, 2021 for Chinese Patent Application No. 201680025680.X , 17 pages.

* cited by examiner

SYSTEM AND METHOD FOR SANDBOXING SUPPORT IN A MULTIDIMENSIONAL DATABASE ENVIRONMENT

CLAIM OF PRIORITY

This application claims the benefit of priority to U.S. Provisional Application titled SYSTEM AND METHOD FOR SANDBOXING SUPPORT IN A MULTIDIMENSIONAL DATABASE", Application No. 62/245,889, filed Oct. 23, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for sandboxing support in a multi-dimensional database environment.

BACKGROUND

Scenario management can help enterprises stay competitive by identifying upcoming opportunities and threats early and integrating them into strategic planning on time. Scenario management requires the use of what-if analyses. In a what-if analysis, one or more data values in a set of data stored in a multidimensional database can be changed to see how the changes will affect the outcome of a formula or a forecasting model that is based on the set of data. Scenario management requires that the underlying multidimensional database stores a different set of data for each what-if analysis in an isolated space so that the data set does not impact a baseline data

SUMMARY

In accordance with an embodiment, described herein is a system and method for providing sandboxing support in a multidimensional database environment. A plurality of sandboxes and a baseline data can be provided in a multidimensional database server, with each sandbox created for a particular what-if analysis and configured to store one or more changes to the baseline data. When a request is received for a report on a particular what-if analysis from a user, the multidimensional database server can split the request into a first query and the second query, with the first query directed to a sandbox associated with the user, and the second query directed to the baseline data. The multidimensional database server can merge results from the first query and the second query, and perform aggregations and calculations on the merged data before sending the merged data to a client.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
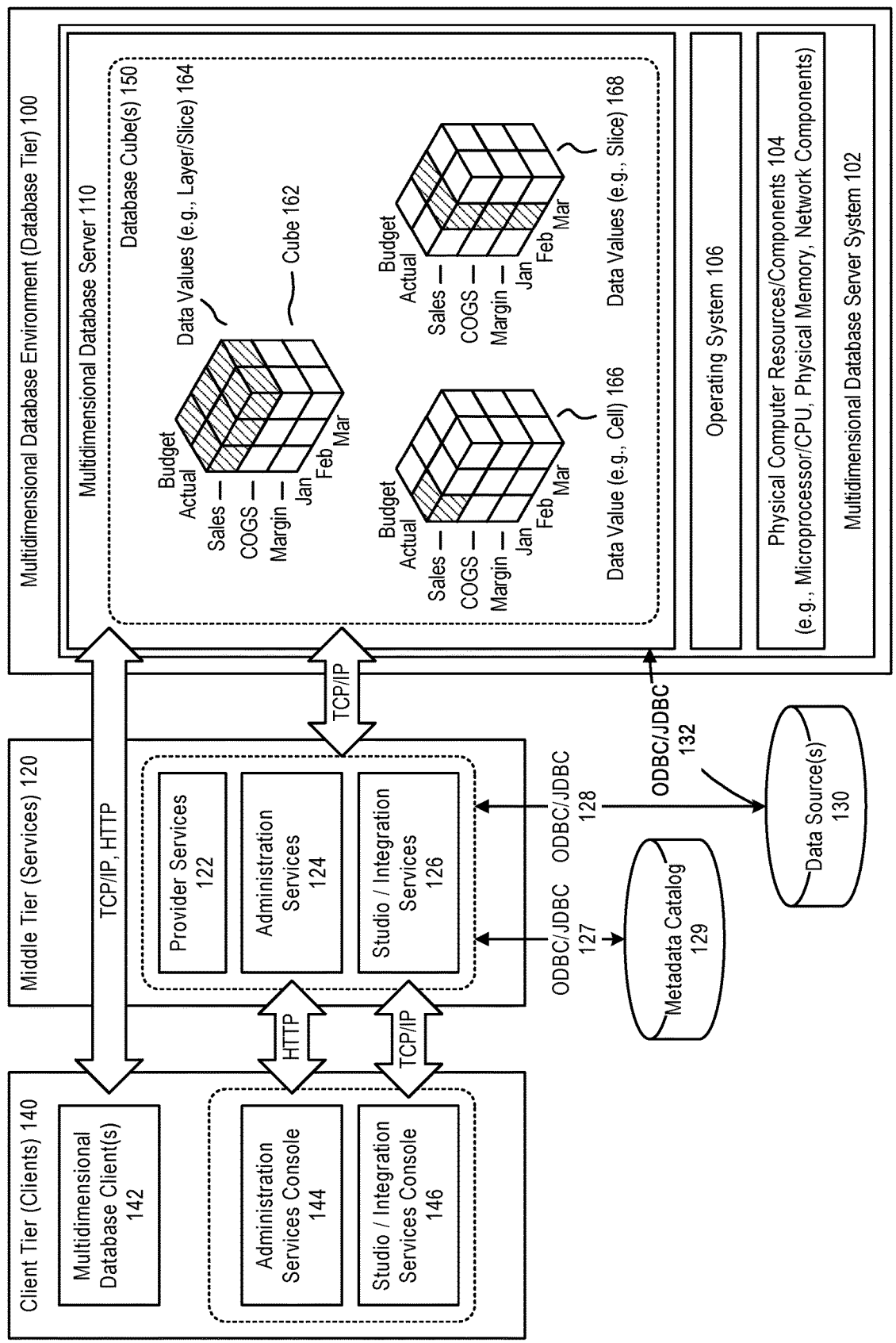
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Sandboxing Support (5693US1)

In accordance with an embodiment, the system and method described herein can provide sandboxing support in a multidimensional database server to support what-if analyses. The multidimensional database server can include a plurality of sandboxes and a baseline data. Each sandbox is created for a particular what-if analysis and configured to store one or more changes to the baseline data. Each of the sandboxes and the baseline data is accessible from their respective views through a graphical user interface.

Existing solutions for performing what-if scenario analyses require that an end user provide a customized multidimensional database client to store different copies of a baseline data set. For a large baseline data set which may include thousands of rows, the existing solutions can be inefficient in terms of system performance and memory consumption.

Embodiments of the present invention can overcome the inefficiency of the existing solutions by providing server-side features that can be used out-of-box without additional work from end users. Additional advantages of the present invention include saving disk space by storing only data changes to the baseline data in each sandbox; and improving system performance by reducing memory footprints in the system, and data traffic between the multidimensional database client and the multidimensional database server.

In accordance with an embodiment, when a request is received for a report on a particular what-if analysis, the multidimensional database server can split the request into a first query and a second query from a user, with the first query directed to a sandbox associated with the user, and the second query directed to the baseline data. The multidimensional database server can merge results from the first query and the second query, and perform aggregations and calculations on the merged data before sending the merged data to a client.

In accordance with an embodiment, the baseline data can represent transactional data, and can serve as a basis for various what-if analyses. A separate sandbox can be created based on a set of data from the baseline data for a different what-if analysis. When a what-if analysis is completed, one or more cells in the set of data can be modified to generate an expected result. The modified cell values can be saved to the sandbox, while the cell values that are not modified remains in the baseline data.

In accordance with an embodiment, the system can include one or more sandboxes for each of a plurality of users, and a baseline data which can be a database cube shared by the plurality of users. Data changes in a sandbox created for a user can be available only to the user, and not available to every other user who has access to the baseline data. A user can publish the data changes in a particular sandbox, for example, when the user determines that a what-if scenario analysis using the data changes yields an expected result. Published data changes from a sandbox are available to other users.

In accordance with an embodiment, each sandbox and the baseline data can be represented by a member in a sandbox dimension in a database outline of the multidimensional database server. When a user creates a sandbox at a graphical user interface, the system can automatically create a corresponding member representing the newly created sandbox in the sandbox dimension of the database outline.

In an accordance with an embodiment, each sandbox can be a private virtual place created for a particular user. A newly created sandbox does not include any data. When the particular user works in a view of the sandbox, the system can trigger the query processor to retrieve a particular set of data specified by the user using a multidimensional expression (MDX) query, and display the retrieved data in the sandbox view. The user can subsequently modify the retrieved data and save only the modification to the sandbox.

The system enables a user to model different business scenarios using one or more private spaces in the database/cube, in which the user can modify one or more cells for each business scenarios to see the impact of the modification.

In accordance with an embodiment, a user can be associated with a plurality of sandboxes, and each sandbox can be associated with a different scenario.

Figure 2:
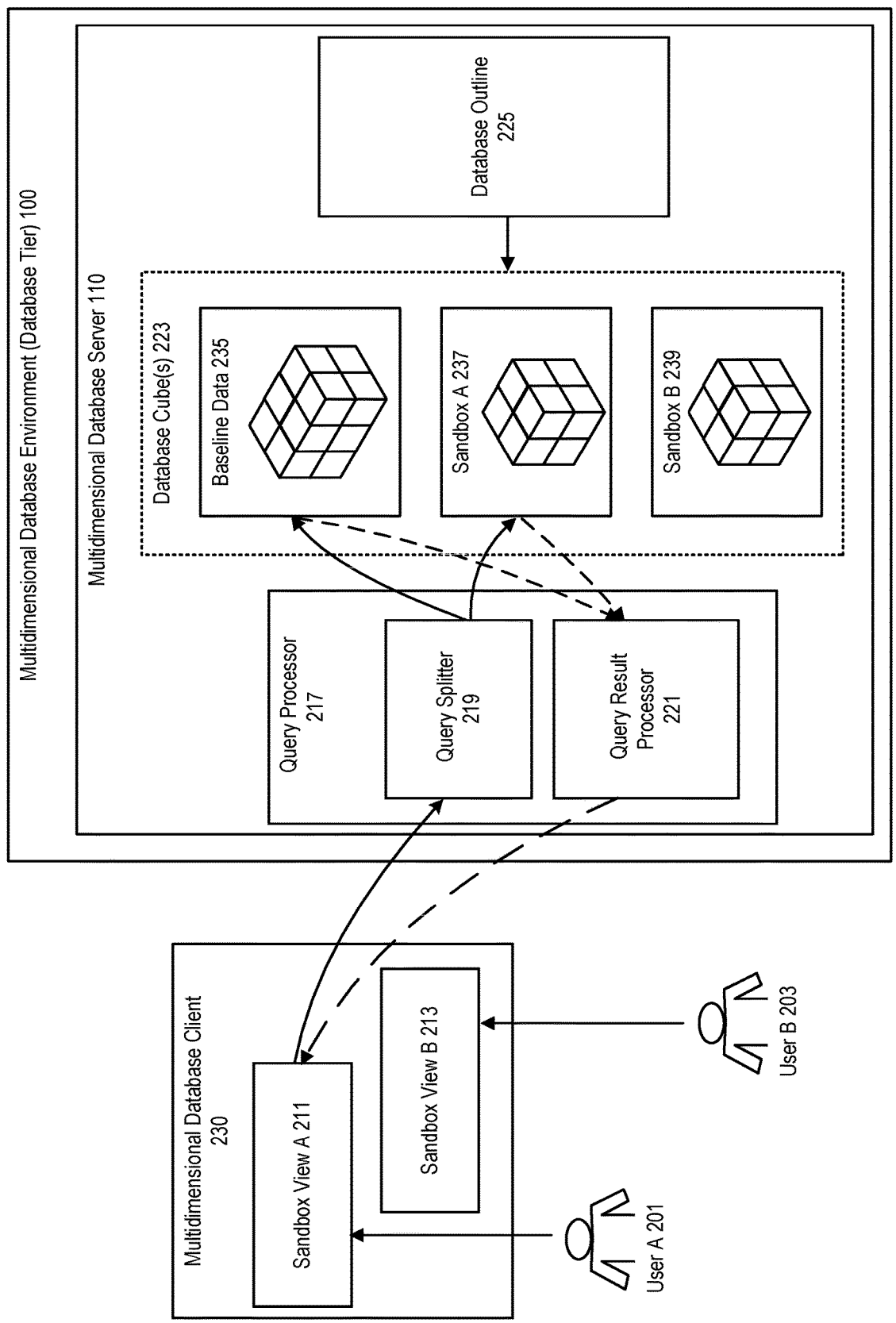
FIG. 2 illustrates a system for sandboxing support in a multidimensional database environment, in accordance with an embodiment.

FIG. 2 illustrates a system for sandboxing support in a multidimensional database environment, in accordance with an embodiment.

As shown in FIG. 2, the system can include a plurality of cubes 223 and a database outline 225 that defines the plurality of cubes in the multidimensional database server. A user (for example, a database user or system administrator) can enable support for sandboxes when a multidimensional database application is created.

In accordance with an embodiment, the plurality of cubes can include a baseline data cube 235, and a plurality of sandboxes (for example, sandbox A 237 and sandbox B 239). Each of the plurality of sandboxes can store a modified data that represents one or more updates to cell values in the baseline data cube.

In accordance with an embodiment, each sandbox can be created for a particular user, and the modified data in a sandbox is accessible only to user A.

In accordance with an embodiment, user A can access the data in sandbox A through a corresponding sandbox view displayed in a graphical user interface (for example, Oracle Smart View for Office) in a multidimensional database client 230.

For example, sandbox A is created for user A 201, and sandbox B is created for user B 203. User A can access the modified data in sandbox A in sandbox view A 211, and user B can access the modified data in sandbox B in sandbox view B 213.

In accordance with an embodiment, each sandbox can be created for a particular what-if analysis.

For example, the baseline data can include sales data for a beverage distribution company that owns a plurality of stores in different cities in the Bay area of the United States. If user A, while examining a set of data retrieved from the baseline data, needs to perform an analysis that the impact that numbers of bottles of beverages sold in Cupertino over a period of five years have on the profitability of the company, the user can create a sandbox (for example, Sandbox A) through the graphical interface interface.

In accordance with an embodiment, data initially displayed in a sandbox view (for example, sandbox view A) can be a set of data from the baseline data, which a user can modify based on the needs of a particular what-if analysis. The modified data can be saved to the corresponding sandbox.

In accordance with an embodiment, a user can request a report describing a what-if analysis. As shown in FIG. 2, a query processor 217 on the multidimensional database server can receive a request for a report on a what-if analysis associated with sandbox A. A query splitter 219 can split the request into a first query and the second query, with the first query directed to sandbox A, and the second query directed to the baseline data.

In accordance an embodiment, the first query and the second query can include the same syntax requesting a same set of data. For example, both queries can request data representing numbers of bottles of beverages sold in Cupertino in 2015 and profitability value each year of the company over the same period of time.

As described above, since a sandbox only stores updated values to the baseline data, a query directed to the sandbox may retrieve a result that contains missing values, for example, values in cells that are not updated for a particular what-if analysis.

In accordance with an embodiment, a query result processor 221 can include a plurality of functions to merge the results from the first query and the second query based on a set of pre-defined rules.

In accordance with an embodiment, if a requested cell exists in a sandbox, the query processor can use the cell value in the sandbox. If the requested cell does not exist in the sandbox, the query processor can use the cell value from the baseline data. The above rules apply when the query processor calculates dynamic hierarchies, or aggregates stored hierarchies for the merged data.

As further shown in FIG. 2, the merged data, for which aggregations and calculations have been performed, can be displayed in sandbox view A.

Figure 3:
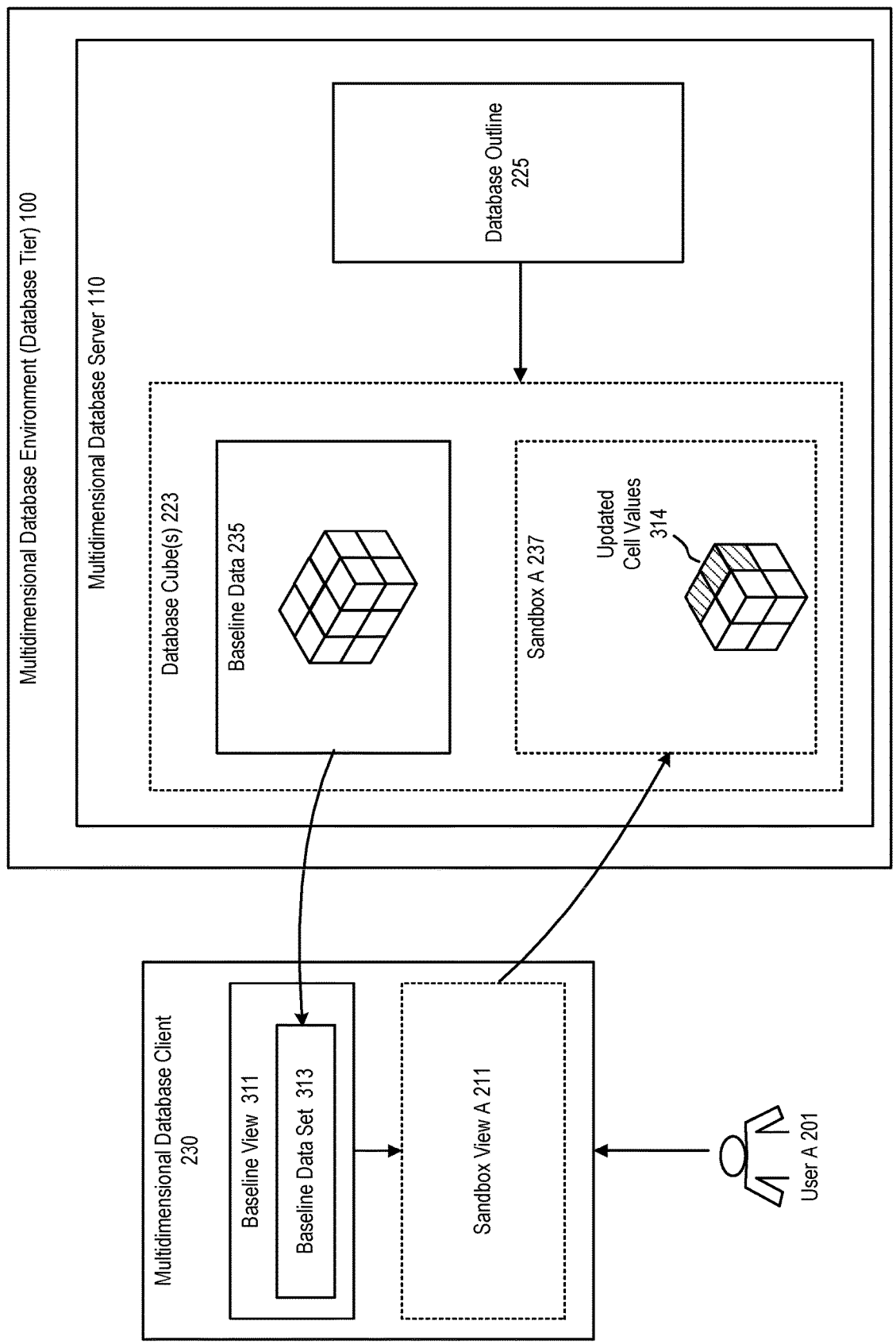
FIG. 3 further illustrates a system for sandboxing support in a multidimensional database environment, in accordance with an embodiment.

FIG. 3 further illustrates a system for sandboxing support in a multidimensional database environment, in accordance with an embodiment.

As shown in FIG. 3, sandbox A can be created by user A at the multidimensional database client while use A is working in a baseline view 311 on a baseline data set 313 from the baseline data.

In accordance with an embodiment, user A can subsequently switch to sandbox view A view to perform a what-if analysis on the baseline data that is initially displayed in user A view. Any change to the baseline data set can be saved as one or more updated cell values 314 to sandbox A in the multidimensional database server.

In accordance with an embodiment, any changes that user A makes to sandbox view A cannot be viewed by another user. The multidimensional database server can enforce a plurality of sandbox ownership and security rules to grant access to a particular sandbox only to an authorized user.

In accordance with an embodiment, changes saved to sandbox A can be published. Published data from a sandbox can be merged into the baseline. After the changes in sandbox A are applied to the baseline data, sandbox A can be deleted.

In accordance with an embodiment, data in a sandbox can be compared against the baseline data, or against data in other sandboxes. A dashboard can be provided to display a side-by-side comparison between different sandboxes or between a sandbox and the baseline data. Alternatively, an ad hoc grid can be provided to display different versions of data from a particular sandbox or from the baseline data.

Figure 4:
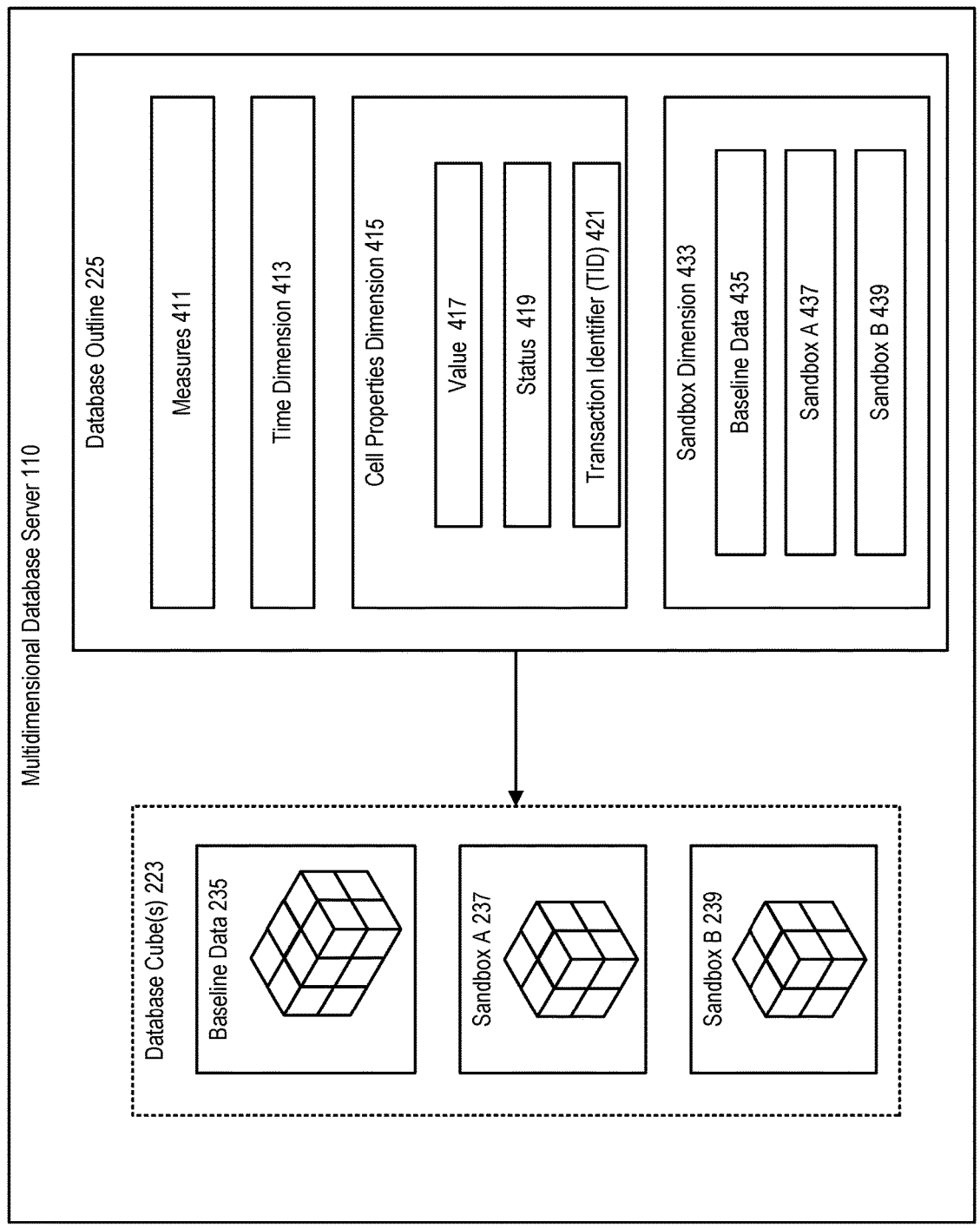
FIG. 4 further illustrates a system for sandboxing support in a multidimensional database environment, in accordance with an embodiment.

FIG. 4 further illustrates a system for sandboxing support in a multidimensional database environment, in accordance with an embodiment.

More particularly, FIG. 4 illustrates the database outline that defines the structure of the plurality of cubes in the multidimensional database server for use in storing the baseline data and the plurality of sandboxes described above.

In accordance with an embodiment, the database outline can include measures 411, a time dimension 413, and a cell properties dimension 415, and a sandbox dimension 433.

In accordance with an embodiment, the sandbox dimension can include a plurality of members that represent the plurality of cubes in the multidimensional database server. As shown in FIG. 4, the sandbox dimension includes a baseline data member 435, and a plurality of sandbox members (for example, sandbox A 437 and sandbox B 439).

In accordance with an embodiment, each sandbox can be created for a particular user, and the modified data in a sandbox is accessible only to user A.

In accordance with an embodiment, to enable sandboxes in the multidimensional database server, the first sparse dimension in the database outline needs to be marked as the sandbox dimension, which can have a "sandbox" dimension type, and be flat. In addition, each member (for example, the baseline data member, sandbox A and sandbox B) in the sandbox dimension can be associated with a tilde (~) as the consolidation operator.

In accordance with an embodiment, the consolidation operator tilde (~) associated with each member in the sandbox dimension can represent a consolidation property which indicates that children do not rollup to the parent within the dimension.

In accordance with an embodiment, the first member in the sandbox dimension can be a baseline data member, and the rest of the members can be sandbox members.

As shown in FIG. 4, the cell properties dimension can be an attribute dimension that includes a value member 417, a status member 419 and a transaction identifier (TID) member 421, for use in describing the data in the sandbox dimension.

For example, the value member can be associated with a plurality of properties to describe the values in each cell in the sandbox dimension. The cell status member can be used to track when and how a particular cell in the sandbox dimension was populated. Exemplary values of the cells status member INPUT, LOAD, CALC, MANUAL ENTRY, and DYNAMIC. The transaction identifier member can specify the latest transaction that modified the cell.

Figure 5:
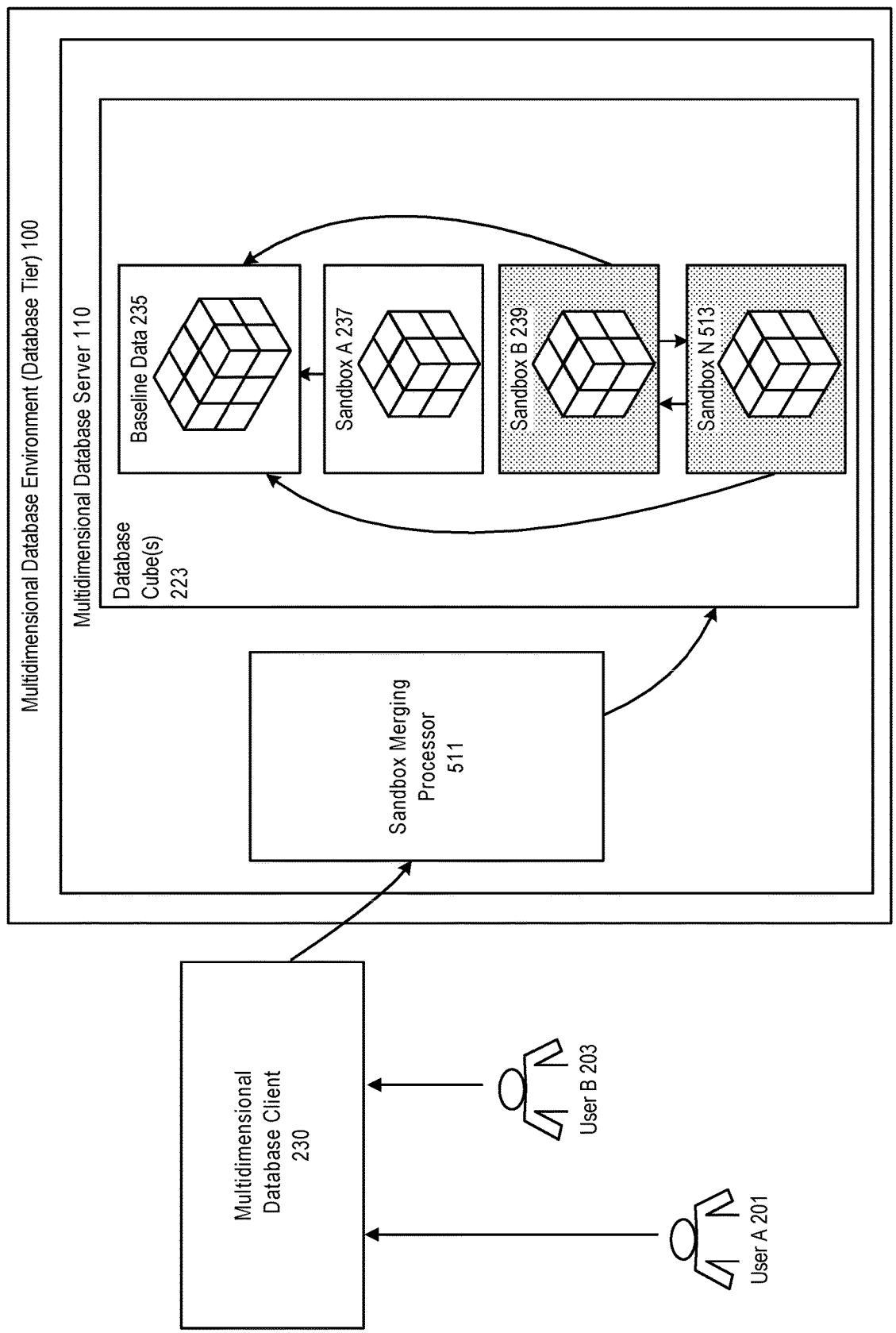
FIG. 5 further illustrates a system for sandboxing support in a multidimensional database environment, in accordance with an embodiment.

FIG. 5 further illustrates a system for sandboxing support in a multidimensional database environment, in accordance with an embodiment.

As shown in FIG. 5, data in a sandbox of a user can be merged into the baseline data, or another sandbox of the user. The merging process can be triggered at the multidimensional database client, and performed by a sandbox merging processor 511 residing on the multidimensional database server.

For example, at the request of user A, data in sandbox A can be published and merged into the baseline data. At the request of user B that is associated with sandbox B and sandbox N 513, data in both sandboxes can be merged into the baseline data. In addition, user B can request that data in sandbox B be merged into sandbox N, or data in sandbox N be merged into sandbox B.

In accordance with an embodiment, when merging data from a source sandbox to a target sandbox or the baseline data, the sandbox merging processor can perform the merging for a slice of a sandbox or an entire sandbox.

In accordance with an embodiment, the sandbox merging processor can execute a merging process with a command with the following exemplary syntax:

DATAMERGE scrMbrName trgMbrName [NOCAL]
[SOURCE|TARGET]

In the above command, scrMbrName is a single sandbox member or a member combination, and trgMbrName is a single sandbox member. As described above, the members of the sandbox dimension can include the baseline data and the plurality of sandboxes. NOCALC indicates that only cells with a status INPUT or LOAD can be copied in the merging process. The value of SOURCE|TARGET is defaulted to SOURCE, which indicates that when the source and target have different values, the source value is used. A user can select TARGET, which indicates that when a target value is missing, or the target status has an associated MERGED flag, the cell is overwritten with a value from the source; otherwise the cell is ignored.

In accordance with an embodiment, the sandbox merging processor can iterate over each non-missing cells in a source sandbox, and determine if the cell should be coped into a target (i.e. target sandbox or the baseline data) in accordance with the value of the SOURCE|TARGET modifier. If a cell from the source sandbox is determined to be merged into the target, the sandbox merging processor can copy the value, status and transaction identifier of the cell to the target. The merging processor can additionally add a MERGED flag to the cell status.

Figure 6:
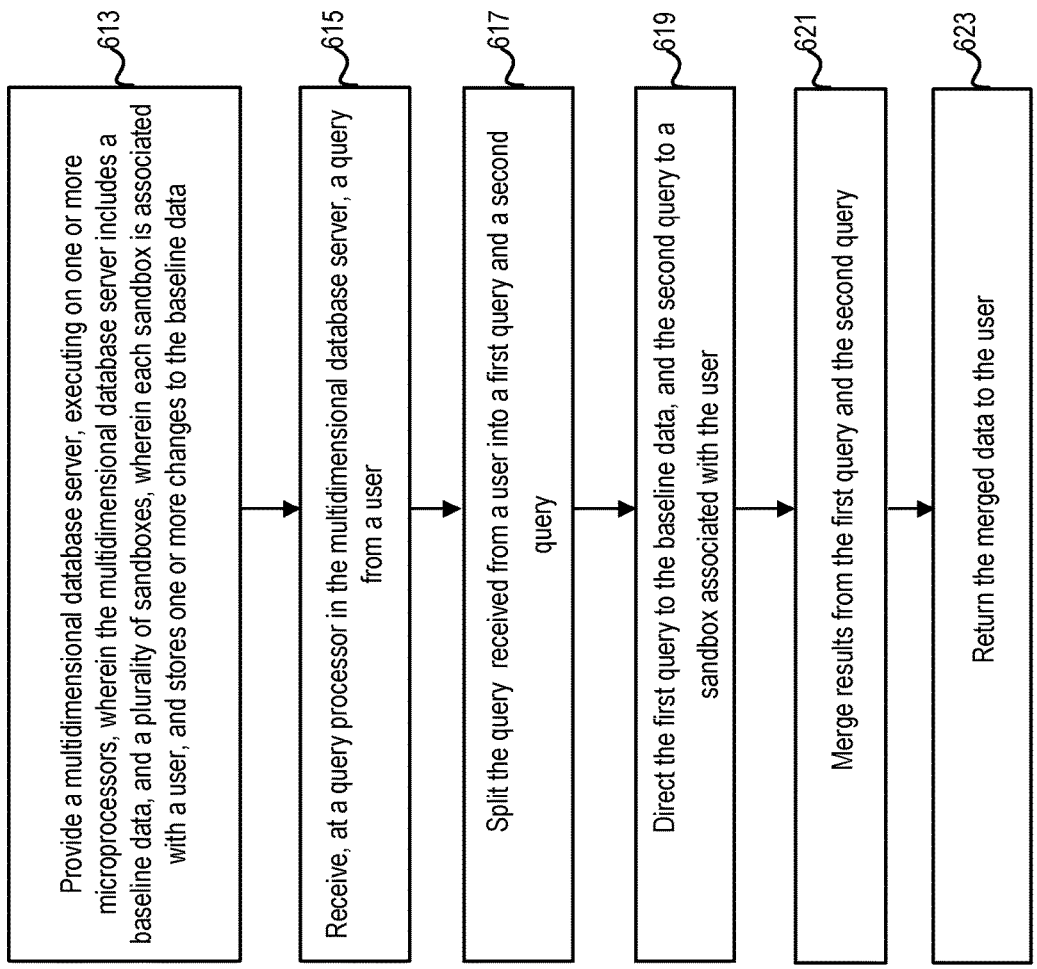
FIG. 6 illustrates a method for sandboxing support in a multidimensional database environment, in accordance with an embodiment.

FIG. 6 illustrates a method for sandboxing support in a multidimensional database environment, in accordance with an embodiment.

As shown in FIG. 6, at step 613, a multidimensional database server executing on one or more microprocessors is provided, wherein the multidimensional database server includes a baseline data, and a plurality of sandboxes, wherein each sandbox is associated with a user, and stores one or more changes to the baseline data.

At step 615, a query is received at a query processor in the multidimensional database server from a user.

At step 617, the query received from the user into a first query and a second query.

At step 619, the query processor directs the first query to the baseline data, and the second query to a sandbox associated with the user.

At step 621, the query processor merges results from the first query and the second query.

At step 623, the query processor returns the merged data to the user.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing sandboxing support in a multidimensional database environment, comprising:
 a computer that includes one or more microprocessors;
 a multidimensional database server executing on the computer, wherein the multidimensional database server includes a baseline data, and a plurality of sandboxes, wherein each sandbox is associated with a user, and stores one or more changes to the baseline data; and
 a query processor in the multidimensional database server, wherein the query processor is configured to:
 split a query received from a user into a first query and a second query, the first query and the second query having a same syntax for requesting respective data representing same information;
 direct the first query to a sandbox associated with the user, and the second query to the baseline data;

merge results from the first query and the second query to produce merged data; and return the merged data to the user.

2. The system of claim 1, wherein each of the plurality of sandboxes is created for a particular what-if analysis.

3. The system of claim 1, wherein the baseline data is data in a cube in the multidimensional database server.

4. The system of claim 1, wherein upon identifying a requested cell in a sandbox, the query processor uses a cell value in the sandbox; otherwise, the query processor retrieves a cell value from the baseline data.

5. The system of claim 1, wherein the one or more changes to the baseline data in each sandbox are available only to a user associated with that sandbox.

6. The system of claim 5, wherein the one or more changes to the baseline data in each sandbox are merged into the baseline data, and becomes available to each user.

7. The system of claim 1, wherein each of the plurality of sandboxes and the baseline data is defined as a member in a sandbox dimension in a database outline of the multidimensional database server.

8. The system of claim 7, wherein the database outline further includes a cell properties dimension for describing data in the sandbox dimension.

9. The system of claim 8, wherein the cell properties dimension includes a status member for tracking how each cell in the sandbox dimension is populated, and a transaction identifier for specifying a latest transaction that modifies each cell.

10. A method for providing sandboxing support in a multidimensional database environment, comprising:

providing a multidimensional database server, executing on one or more microprocessors, wherein the multidimensional database server includes a baseline data, and a plurality of sandboxes, wherein each sandbox is associated with a user, and stores one or more changes to the baseline data;

receiving, at a query processor in the multidimensional database server, a query from a user;

splitting the query received from the user into a first query and a second query, the first query and the second query having a same syntax for requesting respective data representing same information;

directing the first query to a sandbox associated with the user, and the second query to the baseline data;

merging results from the first query and the second query to produce merged data; and returning the merged data to the user.

11. The method of claim 10, wherein each of the plurality of sandboxes is created for a particular what-if analysis.

12. The method of claim 10, wherein the baseline data is data in a cube in the multidimensional database server.

13. The method of claim 10, wherein upon identifying a requested cell in a sandbox, the query processor uses a cell value in the sandbox; otherwise, the query processor retrieves a cell value from the baseline data.

14. The method of claim 10, wherein the one or more changes to the baseline data in each sandbox are available only to a user associated with that sandbox.

15. The method of claim 14, wherein the one or more changes to the baseline data in each sandbox are merged into the baseline data, and becomes available to each user.

16. The method of claim 10, wherein each of the plurality of sandboxes and the baseline data is defined as a member in a sandbox dimension in a database outline of the multidimensional database server.

17. The method of claim 16, wherein the database outline further includes a cell properties dimension for describing data in the sandbox dimension.

18. The method of claim 17, wherein the cell properties dimension includes a status member for tracking how each cell in the sandbox dimension is populated, and a transaction identifier for specifying a latest transaction that modifies each cell.

19. A non-transitory computer readable storage medium, including instructions stored thereon which when read and executed by one or more computers cause the one or more computers to perform the steps comprising:

providing a multidimensional database server, executing on one or more microprocessors, wherein the multidimensional database server includes a baseline data, and a plurality of sandboxes, wherein each sandbox is associated with a user, and stores one or more changes to the baseline data;

receiving, at a query processor in the multidimensional database server, a query from a user;

splitting the query received from the user into a first query and a second query, the first query and the second query having a same syntax for requesting respective data representing same information;

directing the first query to a sandbox associated with the user, and the second query to the baseline data;

merging results from the first query and the second query to produce merged data; and returning the merged data to the user.

20. The non-transitory computer readable storage medium of claim 19, wherein each of the plurality of sandboxes is created for a particular what-if analysis.

* * * * *